US006417287B1

(12) United States Patent
Wege et al.

(10) Patent No.: US 6,417,287 B1
(45) Date of Patent: Jul. 9, 2002

(54) METHOD FOR HYDROGENATING AROMATIC POLYMERS

(75) Inventors: Volker Wege, Krefeld; Johann Rechner, Kempen, both of (DE)

(73) Assignees: Bayer Aktiengesellschaft, Leverkusen (DE); Teijin Ltd., Osaka (JP)

( * ) Notice: Subject to any disclaimer, the term of this patent is extended or adjusted under 35 U.S.C. 154(b) by 0 days.

(21) Appl. No.: 09/581,404

(22) PCT Filed: Dec. 8, 1998

(86) PCT No.: PCT/EP98/07978

§ 371 (c)(1),
(2), (4) Date: Jun. 12, 2000

(87) PCT Pub. No.: WO99/32526

PCT Pub. Date: Jul. 1, 1999

(30) Foreign Application Priority Data

Dec. 18, 1997 (DE) .......................................... 197 56 369

(51) Int. Cl.$^7$ .................................................. C08F 8/04
(52) U.S. Cl. ................. 525/338; 525/332.9; 525/333.3; 525/339; 525/390; 525/437; 525/471; 525/472; 525/480; 525/534; 525/535; 525/536
(58) Field of Search ................................ 525/338, 339, 525/390, 437, 471, 472, 480, 534, 535, 536

(56) References Cited

U.S. PATENT DOCUMENTS

| 4,950,820 A | 8/1990 | Schleppinghoff et al. ... 585/264 |
| 4,997,898 A | 3/1991 | Ishihara et al. ............. 526/308 |
| 5,352,744 A | 10/1994 | Bates et al. ................. 525/339 |

FOREIGN PATENT DOCUMENTS

| CS | 268208 | 7/1990 |
| DE | 1131885 | 6/1962 |
| DE | 1131886 | 6/1962 |
| WO | 96/34896 | 11/1996 |

OTHER PUBLICATIONS

Refractories; Ceramics, p. 27, Week 9221, JP04106107A, "Hydrogenated Styrene Resin Prodn. For Optical Material— by Liq. Phase Hydrogenating Styrene Resin in Solid Catalyst and Either for Opto–Electronics".

Polymer Chem, p. 4, Week 8916, JO1062307A, "Hydrogenated Styrene Resin Prodn.—by Hydrogenating Styrene resin in Reaction Solvent Comprising Mixt. Of Hydrocarbon Solvent and at Least One Polar Solvent".

*Primary Examiner*—Bernard Lipman
(74) *Attorney, Agent, or Firm*—Joseph C. Gil; Aron Preis

(57) ABSTRACT

A process for the hydrogenation of aromatic polymers is disclosed. Accordingly, the solvent used comprise an ether that contains no $\alpha$-hydrogen atom on a carbon atom adjacent to the ether function. The process results in virtually complete hydrogenation of the aromatic units.

10 Claims, No Drawings

METHOD FOR HYDROGENATING AROMATIC POLYMERS

The present invention provides a process for the hydrogenation of aromatic polymers, which process is characterised in that the solvent used is an ether which has no α-hydrogen atom on a carbon atom adjacent to the ether function or a mixture of solvents containing this ether and solvents conventional for hydrogenation reactions.

It is already known to hydrogenate aromatic polymers. DE-AS 1 131 885 describes the hydrogenation of polystyrene in the presence of catalysts and solvents. Solvents which are mentioned in general are aliphatic and cycloaliphatic hydrocarbons, ethers, alcohols and aromatic hydrocarbons. A mixture of cyclohexane and tetrahydrofuran is stated to be preferred.

WO 96/34 896 (=U.S. Pat. No. 5,612,422) describes, for example, a process for hydrogenating aromatic polymers in which hydrogenation is performed in the presence of a metal supported on silicon dioxide as the hydrogenation catalyst, the silicon dioxide having a certain pore size distribution. Solvents which are mentioned are aliphatic or cycloaliphatic hydrocarbons. Diethylene glycol dimethyl ether and tetrahydrofuran are stated as ethers.

EP-A-322 731 describes the production of predominantly syndiotactic crystalline polymers based on vinylcyclohexane, wherein a styrene-based polymer is hydrogenated in the presence of hydrogenation catalysts and solvents. Cycloaliphatic and aromatic hydrocarbons, but not ethers, are mentioned as solvents.

None of the cited documents mentions the ethers described above as solvents. The ethers described in the above-stated documents may form peroxides in air and are solvents which are difficult to control in an industrial process. Were these ethers to be used industrially for hydrogenating aromatic polymers, complex inertisation measures would be necessary in order to keep air away from these solvents. The ethers must furthermore exhibit sufficiently high ignition temperatures since polymers generally come into contact with hot metal surfaces, possibly in the presence of air, during processing.

Pure hydrocarbons as the solvent have the disadvantage, especially in conjunction with nickel catalysts, at elevated polymer concentrations, of requiring elevated reaction temperatures (>160° C.) and elevated pressures for complete hydrogenation of polystyrene (Examples 1, 2). The temperatures are necessary in order to accelerate progress of the hydrogenation reaction to complete conversion within reasonable reaction times and this is accompanied by molecular weight degradation. This degradation is manifested by a reduction in the molecular weights Mn and Mw, in particular reduction in Mw.

For nickel catalysts in these solvents at an elevated polymer concentration, the extent of molecular weight degradation in the completely hydrogenated products is dependent, for example, on pressure and temperature. The molecular weight degradation results in a loss of mechanical properties of the hydrogenated polystyrene. The brittleness of a largely degraded material virtually completely precludes industrial use.

It has now been found that the hydrogenation of aromatic polymers is distinctly improved by using ethers which have no α-hydrogen atom on a carbon atom adjacent to the ether function as the solvent or as a solvent mixture with other solvents suitable for hydrogenation reactions. The process is distinguished in that, especially at elevated polymer concentrations, no appreciable degradation of the final product occurs and no peroxide is formed. Moreover, an increase in catalyst activity is observed which is manifested by lower reaction temperatures and shorter reaction times to complete hydrogenation (Example 3). Addition of these ethers permits higher polymer/catalyst ratios for complete hydrogenation than when purely aliphatic systems are used. The reactions may be performed under identical conditions at lower pressures to achieve complete hydrogenation.

The present invention provides a process for the hydrogenation of aromatic polymers, optionally in the presence of catalysts, wherein an ether which has no α-hydrogen atom on a carbon atom adjacent to the ether function, or a mixture of such ethers or a mixture of at least one of the stated ethers with solvents suitable for hydrogenation reactions is used as the solvent.

The reaction is generally performed at volume concentrations of the ether component relative to the total solvent of 0.1%–100%, preferably of 1%–60%, very particularly preferably of 5%–50%. The ether component may be described as a cocatalyst.

The process according to the invention generally results in virtually complete hydrogenation of the aromatic units. The degree of hydrogenation is usually ≧80%, preferably ≧90%, very particularly preferably ≧99%, in particular 99.5 to 100%. The degree of hydrogenation may be determined, for example, by NMR or UV spectroscopy.

The starting substances used are aromatic polymers which may be selected, for example, from polystyrene optionally substituted in the phenyl ring or on the vinyl group or copolymers thereof with monomers selected from the group of olefins, (meth)acrylates or mixtures thereof Further suitable polymers are aromatic polyethers, in particular polyphenylene oxide, aromatic polycarbonates, aromatic polyesters, aromatic polyamides, polyphenylenes, polyxylylenes, polyphenylenevinylenes, polyphenyleneethylenes, polyphenylene sulfides, polyaryl ether ketones, aromatic polysulfones, aromatic polyether sulfones, aromatic polyimides and the mixtures, copolymers thereof, optionally copolymers with aliphatic compounds.

Substituents on the phenyl ring which may be considered are $C_1$–$C_4$ alkyl, such as methyl, ethyl, $C_1$–$C_4$ alkoxy, such as methoxy, ethoxy, fused aromatics which are attached to the phenyl ring via one carbon atom or two carbon atoms, with phenyl, biphenyl, naphthyl.

Substituents on the vinyl group which may be considered are $C_1$–$C_4$ alkyl, such as methyl, ethyl, n- or iso-propyl.

Olefinic comonomers which may be considered are ethylene, propylene, isoprene, isobutylene, butadiene, cyclohexadiene, cyclohexene, cyclopentadiene, optionally substituted norbornene, optionally substituted dicyclopentadiene, optionally substituted tetracyclododecenes, optionally substituted dihydrocyclopentadienes, $C_1$–$C_8$, preferably $C_1$–$C_4$ alkyl esters of (meth)acrylic acid, preferably methyl and ethyl ester, $C_1$–$C_8$, preferably $C_1$–$C_4$ alkyl ethers of vinyl alcohol, preferably methyl and ethyl ether, $C_1$–$C_8$, preferably $C_1$–$C_4$ alkyl esters of vinyl alcohol; preferably of ethanoic acid, derivatives of maleic acid, preferably maleic anhydride,
derivatives of acrylonitrile, preferably acrylonitrile and methacrylonitrile.

The aromatic polymers generally have molecular weights Mw of 1000 to 10000000, preferably of 60000 to 1000000, particularly preferably of 70000 to 600000, determined by light scattering.

The polymers may have a linear chain structure and have branch points due to co-units (for example graft copolymers). The branch centers contain, for example, star-shaped polymers or other geometric shapes of the primary, secondary, tertiary, optionally quaternary polymer structure.

The copolymers may be random, alternating or in the form of block copolymers.

Block copolymers contain di-blocks, tri-blocks, multi-blocks and star-shaped block copolymers.

The starting polymers are generally known (for example WO 94/21 694).

Ethers of the formula (I) are preferably used as the solvent:

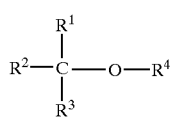
(I)

in which
R$^1$, R$^2$, R$^3$ and R$^4$ mutually independently denote C$_1$–C$_8$ alkyl, which is linear or branched, or C$_5$–C$_6$ cycloalkyl optionally substituted by C$_1$–C$_4$ alkyl or
two of the residues R$^1$, R$^2$, R$^3$ and R$^4$ form a ring having 3 to 8, preferably 5 or 6 carbon atoms.

Methyl t.-butyl ether, ethyl t.-butyl ether, propyl t.-butyl ether, butyl t.-butyl ether, methyl (2-methyl-2-butyl) ether (tert.-amyl methyl ether), 2-ethoxy-2-methylbutane (ethyl tert.-amyl ether) are particularly preferred.

The quantity of catalyst used depends upon the process which is performed, it being possible to perform the process continuously, semi-continuously or discontinuously.

The quantity of catalyst used is described, for example, in WO 96/34 896.

The polymer concentrations, relative to the total weight of solvent and polymer, are generally 80 to 1, preferably 50 to 10, in particular 40 to 15 wt. %.

The starting polymers are hydrogenated using generally known methods (for example WO 94/21 694, WO 96/34 895, EP-A-322 731). Many known hydrogenation catalysts may be used as the catalysts. Preferred metal catalysts are stated, for example, in WO 94/21 694 or WO 96/34 896. Any catalyst known for a hydrogenation reaction may used as the catalyst. Suitable catalysts are not only those having a large surface area (for example 100–600 m$^2$/g) and a small average pore size (for example 20–500 Å) but also those having a small surface area (for example $\geq$10 m$^2$/g) and a large average pore diameter, the pore size distribution of which is characterised in that 98% of the pore volume have pore diameters of greater than 600 Å (for example approx. 1000–4000 Å) (c.f. for example U.S. Pat. No. 5,654,253, U.S. Pat. No. 5,612,422, JP-A 03 076 706). Raney nickel, nickel on silicon dioxide or silicon dioxide/aluminium oxide, nickel on carbon as support and/or noble metal catalysts, for example Pt, Ru, Rh, Pd are in particular used.

The reaction is generally performed at temperatures of between 0 and 500° C., preferably of between 20 and 250° C., in particular of between 60 and 200° C.

Conventional solvents usable for hydrogenation reactions are described, for example, in DE-AS 1 131 885 (c.f. above).

The reaction is generally performed at pressures of 1 bar to 1000 bar, preferably of 20 to 300 bar, in particular of 40 to 200 bar.

EXAMPLES

The absolute molecular weights $\overline{M}$w (weight average) of the starting polymer and of the hydrogenated polymer are determined. Membrane osmosis reveals the absolute molecular weights $\overline{M}$n (number average). In Example 3 (table), the relative values of the GPC measurement against a polystyrene standard correspond to the determined absolute molecular weights of the polystyrene used.

Examples 1–3

A 1 liter autoclave is flushed with inert gas. The polymer solution and catalyst are added (table). Once sealed, the autoclave is repeatedly pressurised with protective gas and then with hydrogen. After depressurisation, the particular hydrogen pressure is established and the mixture heated with stirring to the appropriate reaction temperature. The reaction pressure is held constant once hydrogen absorption has begun.

The reaction time is the time from heating the mixture until hydrogenation of the polystyrene is complete or, in the event of incomplete hydrogenation, the time until hydrogen absorption moves towards saturation.

Once the reaction is complete, the polymer solution is filtered. The product is precipitated in methanol and dried. The isolated product exhibits the physical properties shown in the table.

TABLE

Hydrogenation of polystyrene as a function of solvent system and reaction temperature

| Example no. | Polymer mass g | Solvent ml | Catalyst mass[3] g | Reaction temperature ° C. | H$_2$ pressure bar | Reaction time h | Degree of hydrogenation[1] % | Tg (DSC) ° C. | $\overline{M}$n 10$^3$ g/mol | $\overline{M}$w 10$^3$ g/mol |
|---|---|---|---|---|---|---|---|---|---|---|
| 1 Comparison | 100.2[2] | 300 CYH | 12.5 | 160 | 100 | 13 | 98.5 | 148 | 70.0 | 170.4 |
| 2 Comparison | 100.2[2] | 300 CYH | 12.5 | 200 | 100 | 7 | 100 | 148 | 47.5 | 108.1 |
| 3 Invention | 100.2[2] | 200 CYH + 100 MTBE | 12.5 | 160 | 100 | 6 | 100 | 149 | 71.6 | 176.4 |

[1] Determined by $^1$H-NMR spectroscopy
[2] Polystyrene grade 158 k, $\overline{M}$w = 280000 g/mol, BASF AG, Ludwigshafen, Germany
[3] Aldrich Ni/SiO$_2$/Al$_2$O$_3$, 64–67% Ni
CYH = cyclohexane
MTBE = methyl tert.-butyl ether The nickel catalyst (table) does not completely hydrogenate polystyrene at 160° C. in a reaction time of 13 hours (Comparative Example 1). In comparison, the hydrogenation reaction proceeds to completion after 7 hours at 200° C., but with a severe decrease in molecular weight. Addition of the methyl tert.-butyl ether results in a reduction of the reaction temperature required for hydrogenation, at a reaction time similar to that without addition of this solvent component at 200° C. (Comparative Example 2), but while retaining the absolute molecular weights Mn and Mw in comparison with the starting polymer (Example 3).

What is claimed is:

1. Process for the hydrogenation of aromatic polymer, wherein at least one ether which has no α-hydrogen atom on a carbon atom adjacent to the ether function, or a mixture of this ether or mixtures of these ethers with solvents suitable for hydrogenation reactions is used as the solvent.

2. Process according to claim 1, wherein compounds of the formula (I)

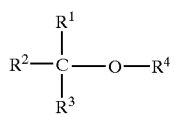

in which
R$^1$, R$^2$, R$^3$ and R$^4$ mutually independently denote C$_1$–C$_8$ alkyl, which is linear or branched, or C$_1$–C$_6$ cycloalkyl optionally substituted by C$_1$–C$_4$ alkyl or
two of the residues R$^1$, R$^2$, R$^3$ and R$^4$ form a ring having 3 to 8 carbon atoms
are used as the ether.

3. The process according to claim 1 wherein aromatic polymer is at least one member selected from the group consisting of polystyrene, polyether, polycarbonate, polyester, polyamide, polyphenylene, polyxylylene, polyphenylenevinylene, polyphenyleneethylene, polyphenylene sulfide, polyaryl ether ketone, polysulfone, polyether sulfone, polyimide and copolymers of said member.

4. The process of claim 3 wherein polystyrene is substituted in the phenyl ring.

5. The process of claim 3 wherein polystyrene is substituted on the vinyl group.

6. The process of claim 1 wherein aromatic polymer is a copolymer of styrene with at least one member selected from the group consisting of olefin and (meth)acrylate.

7. A process for the hydrogenation of an aromatic homopolymer wherein at least one ether which has no α-hydrogen atom on a carbon atom adjacent to the ether function, or a mixture of this ether with solvents suitable for hydrogenation reaction is used as the solvent, said homopolymer selected from the group consisting of polystyrene, polyether, polycarbonate, polyester, polyamide, polyphenylene, polyxylylene, polyphenylenevinylene, polyphenyleneethylene, polyphenylene sulfide, polyaryl ether ketone, polysulfone, polyether sulfone and polyimide.

8. The process of claim 7 wherein ether conforms to

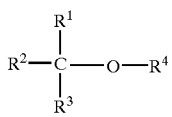

in which
R$^1$, R$^2$, R$^3$ and R$^4$ mutually independently denote C$_1$–C$_8$ alkyl, which is linear or branched, or C$_5$–C$_6$ cycloalkyl optionally substituted by C$_1$–C$_4$ alkyl or
two of the residues R$^1$, R$^2$, R$^3$ and R$^4$ form a ring having 3 to 8, carbon atoms.

9. The process of claim 7 wherein polystyrene is substituted in the phenyl ring.

10. The process of claim 7 wherein polystyrene is substituted on the vinyl group.

* * * * *